United States Patent [19]
Peterson et al.

[11] 4,394,577
[45] Jul. 19, 1983

[54] DISPLACEMENT MEASUREMENT DEVICE AND METHOD

[75] Inventors: Marvin L. Peterson; Norman W. Hein, Jr.; Donald H. Oertle, all of Ponca City, Okla.

[73] Assignee: Conoco Inc., Ponco City, Okla.

[21] Appl. No.: 277,441

[22] Filed: Jun. 25, 1981

[51] Int. Cl.³ .............................................. G01J 1/42
[52] U.S. Cl. ................................... 250/372; 250/302; 250/461.1; 33/127; 173/21; 356/387
[58] Field of Search .................. 250/372, 459.1, 460.1, 250/560, 302; 235/465, 469, 491; 356/385–387; 364/562; 378/162, 163; 33/127; 173/21

[56] References Cited

U.S. PATENT DOCUMENTS

| 2,580,299 | 12/1951 | Hunicke | 73/84 |
| 2,989,690 | 6/1961 | Cook | 250/560 |
| 3,498,388 | 3/1970 | Jovis | 73/2 |
| 3,838,428 | 9/1974 | Benson et al. | |
| 3,839,637 | 10/1974 | Willis | 250/302 |
| 4,309,609 | 1/1982 | Sampson | 250/341 |

FOREIGN PATENT DOCUMENTS 616529  7/1978  U.S.S.R. ............................... 33/137

Primary Examiner—Alfred E. Smith
Assistant Examiner—Carolyn E. Fields
Attorney, Agent, or Firm—A Joe Reinert

[57] ABSTRACT

At least two types of reflective or emissive materials are applied in alternating manner to a pile or other object to be moved. Ultraviolet energy is emitted toward the materials and reflections or emissions therefrom are received by appropriate detector elements which convert the different respective reflected or emitted energy spectra into corresponding electrical signals for use by a processor device to determine the distance and rate which the pile or object is being moved. The calculated information is channeled to a suitable display and a permanent recording device.

16 Claims, 1 Drawing Figure

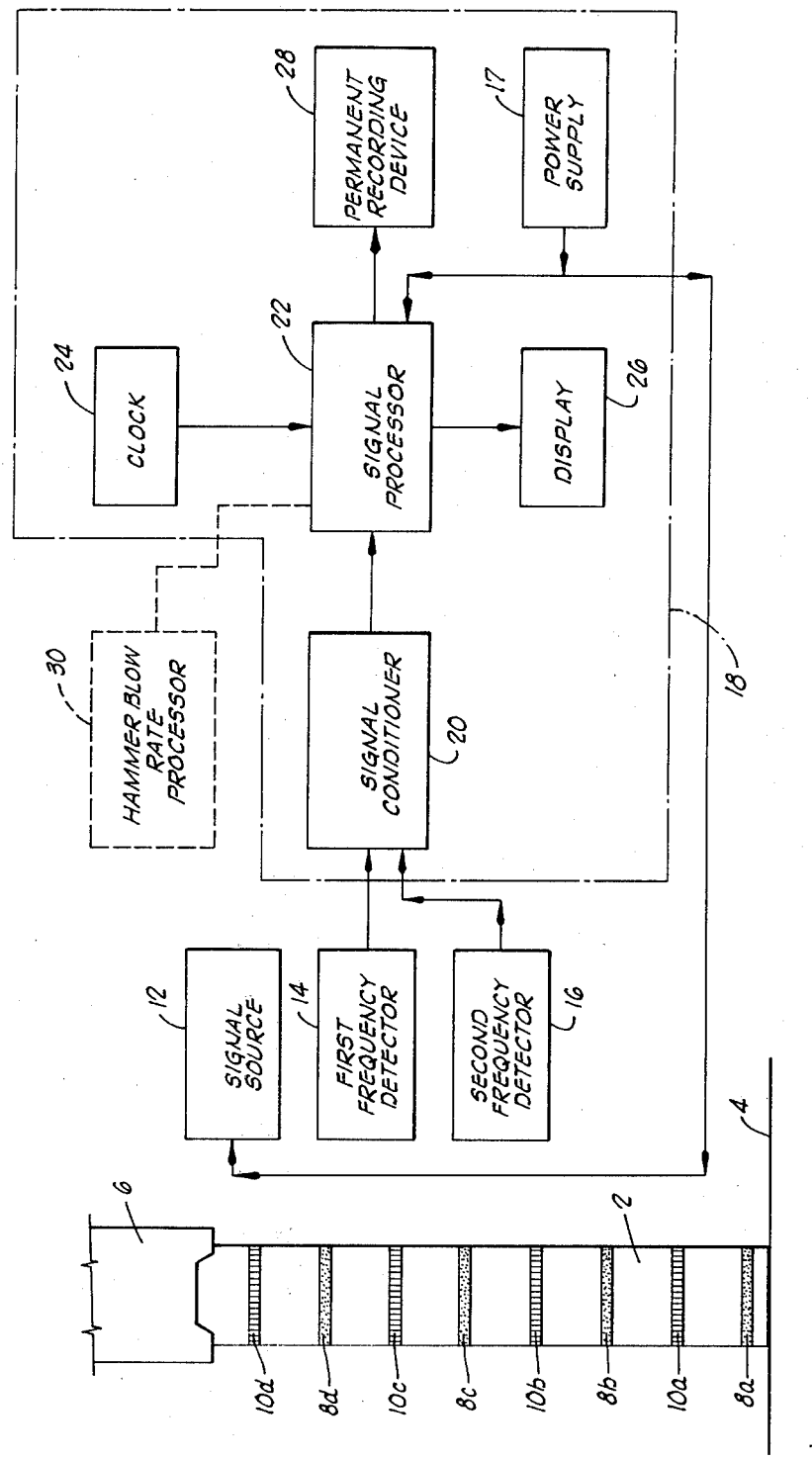

DISPLACEMENT MEASUREMENT DEVICE AND METHOD

BACKGROUND OF THE INVENTION

1. Field of the Invention

This invention relates generally to methods and apparatus for monitoring the displacement of an object so that the distance and rate of movement of the object can be automatically and remotely determined. The invention relates more particularly, but not by way of limitation, to methods and apparatus for determining how far and at what rate a pile is driven.

2. Description of the Prior Art

It is often necessary to monitor an object to determine how far and how fast it moves or is being moved by an outside force. For example, in the construction of offshore petroleum production structures it is necessary to drive piles into the sea floor to support the production platform. To insure that each pile is driven into the proper position to support the portion of the load to be carried by it but is not overdriven to the extent of causing damage to the pile, it is important to know how far and at what rate the pile is being driven. Besides assisting in determining the proper positioning of the pile, this distance and rate information is useful in monitoring the efficiency of the pile driving operation.

Because of the criticality of knowing the distance and rate information of a pile driving operation, there have been attempts at or proposals for various means for compiling this information. For example, white marks have been placed on piles at predetermined intervals, and a person has visually counted and recorded on a manual counting device the number of marks which pass the person (or some other suitable reference point) as the pile is driven. This information can be used to determine the distance the pile has been driven; and with the use of a clock, the rate at which the driving occurs can be determined.

Additionally, high-speed photography has been used to record the motion of the pile as it is being driven. The use of reflected laser light has also been attempted.

Although one may be able to obtain the necessary information from any one of the aforementioned previous attempts or proposals, the previous attempts or proposals may not be suitable for use at night or under high-glare conditions. Additionally, inclement weather can impair the use of the aforementioned techniques. Excessive vibration which can occur in pile-driving operations likewise hampers the use of the foregoing techniques.

Therefore, there is the need for a device which automatically and remotely determines the distance an object has moved and which makes such determinations regardless of the type of weather, time of day or state of the object (e.g., excessive vibration).

SUMMARY OF THE INVENTION

The present invention overcomes the above-noted and other shortcomings of the prior art by providing a novel and improved method and apparatus for monitoring the displacement of an object. This apparatus automatically and remotely determines the distance the object moves and the rate at which the object moves. The present invention is also constructed so that it can be used in various types of weather, at various times of the day, and for different states of the object.

Broadly, the present invention includes multi-frequency energy source means for providing an output having frequencies within a predetermined spectrum of at least two frequencies, detector means for detecting when a first one of the two frequencies has reached the object at a predetermined location thereon and for detecting when a second one of the two frequencies has reached the object at a second predetermined location thereon and at a time later than that time at which the first frequency reached the object, and means, responsive to the detector means, for monitoring the alternate detection of the first and second frequencies and for deriving the displacement of the object therefrom.

The present invention further comprises frequency responsive means including in a preferred embodiment first reflector means for reflecting a first predetermined spectrum of energy in response to the energy from the source means impinging on the reflector means. The frequency responsive means also includes second reflector means for reflecting a second predetermined spectrum of energy in response to the energy from the source means impinging thereon.

The multi-frequency energy source means includes means for emitting ultraviolet energy.

The means for monitoring the alternate detection of the first and second frequencies and for deriving the displacement of the object therefrom includes signal processor means for determining when the detector means detects that the first one of the two frequencies has reached the object and for determining when the detector means detects that the second frequency has reached the object. The means also includes signal conditioner means for electrically converting signals from the detector means into respective corresponding signals having respective formats detectable by the signal processor means.

Therefore, from the foregoing it is a general object of the present invention to provide a novel and improved method and apparatus for monitoring the displacement of an object. Other and further objects, features and advantages of the present invention will be readily apparent to those skilled in the art when the following description of the preferred embodiments is read in conjunction with the accompanying drawing.

BRIEF DESCRIPTION OF THE DRAWING

The drawing discloses a schematic and functional block diagram of the apparatus constructed in accordance with the present invention.

DETAILED DESCRIPTION OF PREFERRED EMBODIMENTS OF THE PRESENT INVENTION

With reference to the drawing a preferred embodiment of an apparatus constructed in accordance with the present invention will be described. The embodiment shown in the drawing is shown in use with a pile 2 which is to be driven into a supporting structure 4, such as the ground, by a suitable pile driving means 6.

The apparatus constructed in accordance with the present invention includes first frequency responsive means 8 for providing a first frequency output and a second frequency responsive means 10 for providing a second frequency output. In the preferred embodiment the first frequency responsive means 8 includes a first reflector means and the second frequency responsive means 10 includes a second reflector means. As shown in the drawing, the first reflector means specifically includes a first plurality of reflectors (identified as bands 8a–8d) comprising a suitable reflective material. Each of these reflectors is preferably applied as a reflective band painted or otherwise applied around the circumference of the pile 2. The second reflector means comprises a second plurality of reflectors as identified in the drawing by the reference numerals 10a–10d. The reflectors 10a–10d are constructed of a suitable material which is applied in a suitable manner to the pile 2 similarly to the reflectors 8a–8d. It is noted that more or less than four bands can be included in each of the responsive means 8 and 10; four are shown in the drawing for purposes of illustration.

The substance included within the preferred embodiment reflective bands 8a–8d has reflective properties which differ from the reflective properties of the substance included within the preferred embodiment reflective bands 10a–10d. Because of the different reflective properties of the particular substances which are included in the bands 8a–8d and 10a–10d, the first frequency responsive means provides a first reflective output in response to a signal having a frequency within a first portion of a predetermined spectrum of frequencies provided by a multi-frequency energy source means 12, and the second frequency responsive means provides a second reflective output in response to a signal having a frequency within a second portion of the spectrum of frequencies provided by the multi-frequency energy source means 12. In the preferred embodiment the multi-frequency energy source means 12 emits ultraviolet energy toward the first and second pluralities of reflectors, and the first plurality of reflectors and the second plurality of reflectors provide in response thereto two distinctive, detectable ultraviolet energy reflections which are detectable by suitable detector means which include in the preferred embodiment shown in the drawing a first frequency detector means 14 and a second frequency detector means 16.

By way of a specific example, the reflectors 8a–8d include a suitable paint substance which is responsive to a first portion or spectrum of the ultraviolet energy emitted by the signal source means 12. The reflectors 8a–8d respond to the ultraviolet energy impinging thereon by reflecting a portion of the ultraviolet energy having one or more predetermined frequencies. The reflectors 10a–10d include a paint substance different from that included in the reflectors 8a–8d so that the composition of the reflectors 10a–10d responds to the impinging energy by reflecting a different portion of the ultraviolet energy spectrum than is reflected by the reflectors 8a–8d. It is to be noted that additional reflectors responsive to different portions of the spectrum of frequencies emitted by the signal source means 12 and which reflect energy at frequencies different from those reflected by the reflectors 8a–8d and 10a–10d can also be used.

In another embodiment the bands 8a–8d and 10a–10d include respective substances which are excited by the energy signals from the signal source means 12 so that energy signals at frequencies different from the frequencies of the signals from the signal source means 12 are emitted. For example, the substances might emit visible light energy signals in response to ultraviolet energy signals from the signal source means 12. Other types of substances can also be used.

The different types of bands (e.g., reflectors 8a–8d and 10a–10d) are suitably disposed on or applied to the pile 2 in an alternating manner and at predetermined spacings therebetween. In the illustrated preferred embodiment which utilizes two types of reflectors, each reflective band is spaced from each other band at one-foot intervals whereby reflective bands of identical material (e.g., reflectors 8a and 8b) are spaced at two-foot intervals. In other words, each of the second plurality of reflectors is disposed between respective consecutive ones of the first plurality of reflectors whereby an alternating arrangement of the first and second pluralities of reflectors is formed. If a third reflector means were used, the spacing between similar types of reflectors would be at three-foot intervals for an arrangement comparable to that shown in the drawing. It is noted that other spacing intervals can be used.

The multi-frequency energy source means 12 includes a suitable device which provides an output of radiant energy having frequencies within a predetermined spectrum of at least two frequencies. In other words, the multi-frequency energy source means 12 provides an output of energy which is radiating at at least two frequencies. In the preferred embodiment the energy emitted by the frequency source means 12 is in the ultraviolet spectrum because the preferred embodiment is contemplated for use with pile-driving operations at offshore drilling platform locations which are operated both day and night and which have few sources of ultraviolet energy to interfere with the operation of the present invention. For example, if piles are being driven at night, work lights emitting energy in the visible light spectrum but little energy in the ultraviolet spectrum are used by the platform workers. Because the work lights emit visible light, it is undesirable to have the multi-frequency energy source means 12 also emit visible light as the signal to which the responsive means 8 and 10 respond; however, the energy source means 12 can emit ultraviolet energy and not be interfered with by the use of work lights which emit relatively little, if any, ultraviolet energy.

The multi-frequency energy signal source means 12 is spaced remotely from the pile 2 and coatings 8 and 10 thereon so that the present invention can be operated remotely to determine the depth to which the pile 2 is driven. The medium which separates the signal source means 12 from the responsive means 8 and 10 can be any suitable medium such as air or water. Depending upon the specific medium, the specific energy emitted by the source means 12 may have to be varied to prevent the energy from being overly attenuated on its passage through the intervening medium. The signal source means 12 is energized to emit the predetermined energy by means of a suitable power supply means 17.

The present invention also includes the detector means which comprises the first frequency detector means 14 and the second frequency detector means 16. The detector means detects when a first one of the frequencies within a spectrum of energy emitted by the signal source means 12 has reached the object (which object is specifically identified in the drawing as the pile 2) at a predetermined location thereon. The detector means also detects when a second one of the frequencies of energy emitted by the source means 12 has reached the object at a second predetermined location thereon and at a time later than that time at which the first frequency of energy reached the object.

In the preferred embodiment the first frequency detector means 14 detects the reflected or emitted output from one of the first bands 8a–8d. The first detector means, upon detecting this output, provides a first electrical signal corresponding thereto. In particular, the first frequency detector means 14 includes a transducer means for converting the reflected or emitted output of a respective one of the first bands 8a–8d into a corresponding electrical signal. In this manner the first predetermined spectrum of energy reflected or emitted by the first responsive means 8 is converted into a first electrical signal.

The second frequency detector means 16 operates similarly to the first frequency detector means 14; however, the second detector means 16 detects the second frequency output which is provided by a respective one of the second bands 10a–10d and provides a second electrical signal corresponding thereto. The second detector means 16 converts the reflected or emitted second predetermined spectrum of energy into the corresponding second electrical signal. In particular the second frequency detector means 16 includes transducer means for converting the reflected or emitted second predetermined spectrum of energy into the corresponding second electrical signal. The transducer means of the first frequency detector means 14 and the transducer means of the second frequency detector means 16 include suitable sensors for detecting the reflected or emitted energy.

The first electrical signal provided by the first detector means 14 and the second electrical signal provided by the second detector means 16 are electrically connected to a signal conditioner means 20. The signal conditioner means 20 forms a part of a means 18 for monitoring the alternate detection of the first and second frequencies of energy reflected or emitted by the first and second responsive means 8 and 10, respectively, and for deriving the displacement of the pile 2 therefrom. The monitoring by the means 18 is done in response to the signals from the first and second detector means 14 and 16.

The means 18, through its component parts described hereinbelow, responds to the consecutive detection of the first electrical signal of the first detector means 14 and the second electrical signal of the second detector means 16 and derives the distance the object has moved therefrom. In other words, the means 18 monitors for the first electrical signal which is provided when the first frequency detector means 14 detects a reflection or emission from a respective one of the bands 8a–8d. Having monitored the detection of the first electrical signal, the means 18 then responds only to the second electrical signal which indicates the detection by the second frequency detector means 16 of a reflected or emitted output from a respective one of the second bands 10a–10d. Upon receiving the second electrical signal, the means 18 then waits for another first electrical signal as provided by the next band of the first frequency responsive means 8. Generally, the means 18 performs any encoding, decoding, calculating and recording of the electrical signals which are generated in response to the detection of the reflected or emitted energy signals from the responsive means 8 and 10.

The means 18 includes the signal conditioner means 20 for electrically converting the first electrical signal and the second electrical signal from the first frequency detector means and the second frequency detector means 14 and 16, respectively, into respective corresponding electrical signals having respective formats detectable by a signal processor means 22 which forms another part of the means 18. For example, the signal conditioner means 20 includes electrical circuit means for converting analog electrical signals which might comprise the first and second electrical signals into corresponding digital signals which can be used by the signal processor means 22. In this manner, the conditioner means 20 electrically interfaces the signal processor means 22 with the detector means.

The signal processor means 22 utilizes the signals from the signal conditioner means 20 for determining when the first detector means 14 detects a first frequency output from a respective one of the first bands 8a–8d and for then determining when the second detector means 16 detects the second frequency output provided by a respective one of the second bands 10a–10d before again determining when the first detector means 14 detects the first frequency output from the next respective one of the first bands 8a–8d. In the preferred embodiment the signal processor means 22 is contemplated to include a microprocessor means.

The microprocessor means includes first utilizing means for utilizing the first electrical signal, as conditioned by the signal conditioner means 20, to derive a first position of the object; first disabling means for disabling the first utilizing means to prevent the utilization of the first electrical signal after the first position is derived; second utilizing means for utilizing the second electrical signal, as conditioned by the signal conditioner means 20, to derive a second position of the object and for enabling the first utilizing means; and a second disabling means for disabling the second utilizing means to prevent the utilization of the second electrical signal until after the first position is derived. These elements of the microprocessor means are generally provided under control of a suitable program contained within a program memory portion of the microprocessor means.

The signal processor means 22 receives a timing signal from a clock means 24, such as a crystal oscillator, which is also included within the preferred embodiment of the means 18. The clock means 24 provides a timing signal with which the signal processor means 22 can determine the rate at which the object is driven into the supporting structure 4.

As the signal processor means 22 derives the distance and the rate at which the pile 2 is driven, a suitable electrical output is provided to a display means 26 for locally visually displaying the received and calculated information. An output is also provided by the signal processor means to a permanent recording means 28 such as a line printer or magnetic tape recording device. The display means 26 and the recording means 28 form additional parts of the means 18.

To energize the present invention the power supply means 17 is included within the means 18 so that the apparatus can be operated off either alternating current or direct current electrical energy sources in the preferred embodiment.

In operation the signal source means 12 emits a predetermined spectrum of energy which in the preferred embodiment is a spectrum of ultraviolet energy. This energy is directed toward the object with which the first and second responsive means 8 and 10 are associated. In the preferred embodiment the object is the pile 2.

As the energy impinges upon the responsive means 8 and 10, predetermined portions of the impinging energy or of energy excited thereby are reflected or emitted thereby for detection by the first and second detector means 14 and 16. The first and second frequency detector means 14 and 16 are suitably positioned so that each receives reflected or emitted output from a respective one of the bands or elements 8a–8d and 10a–10d of the first and second responsive means 8 and 10 as it passes a predetermined position. This prevents each frequency detector means from receiving reflections or emissions from more than one of the plurality of bands at any one time.

By way of illustration, it will be assumed that ultraviolet energy is emitted by the signal source means 12. It will be further assumed that the bands 8a–8d and 10a–10d are reflective and that both the first frequency detector means 14 and the second frequency detector means 16 receive reflected output only when one of the reflectors is at a position which is shown in the drawing to be presently occupied by the reflector 8d. Thus, as the pile driving means 6 drives the pile 2 into the ground 4, at the position of the pile 2 shown in the drawing the ultraviolet energy emitted by the signal source means 12 impinges upon the reflector 8d. The reflector 8d reflects a predetermined portion of the spectrum for reception by both the first frequency detector means 14 and the second frequency detector means 16. Because the second frequency detector means 16 is not responsive to the spectrum of energy reflected by the reflector means 8d, whereas the first frequency detector means 14 is so responsive, the first frequency detector means 14 provides a respective first electrical signal to the signal conditioner means 20 signifying that a reflector band comprised of the reflective material used for the reflectors 8a–8d has reached the predetermined detection location.

The signal conditioner means 20 appropriately modifies the first electrical signal into an electrical signal usable by the signal processor means 22 to determine that the pile 2 has been driven to a position such that a band of the first reflector type has been detected. Upon receiving this type of signal, the signal processor means 22 is controlled by the program contained therein so that it will no longer recognize or utilize an electrical signal corresponding to the first electrical signal provided upon the detection of a reflection from a first reflector means 8. This control is necessary to prevent misreadings which can occur, for example, because of the finite width of each band of reflective material or because of the vibrations and bouncing of the pile 2 as it is driven into the ground 4.

As the pile driving means 6 drives the pile 2 farther into the ground 4, the reflector 10d is moved into the position above the ground which was formerly occupied by the reflector 8d. As the second reflector 10d moves into this position, it reflects the second frequency output comprising the second predetermined portion of energy in response to the ultraviolet energy from the signal source means 12 impinging thereon. Although the second frequency output of energy is received by both the first and second frequency detector means 14 and 16, only the second frequency detector means 16 is responsive thereto and thereby provides a second electrical signal to the signal conditioner means 20.

Upon suitable conditioning by the signal conditioning means 20, the second electrical signal is provided to the signal processor means 22. When the signal processor means 22 receives this second electrical signal, it is able to determine, under control of the program contained in the microprocessor means, that the pile 2 has been driven the predetermined distance as defined by the spacing between the adjacent first reflector 8d and the second reflector 10d. Also upon receiving the second electrical signal, the signal processor means 22 will again recognize the reception of a first electrical signal as generated by the first frequency detector means 14 in response to the detection of a reflection from the next band of the plurality of first reflector means 8, but the processor means 22 will not recognize a second electrical signal from the second frequency detector means 16 until after a first electrical signal is again detected. In this alternating manner the distance to which the pile 2 is driven can be determined. Additionally, by utilizing the clock means 24 in conjunction with the calculated distance information, the signal processor means 22 can determine the rate at which the pile 2 is being driven into the ground 4 by the pile driving means 6.

Upon performing the calculations whereby the distance and rate are determined, the signal processor means controls the display means 26 and the permanent recording device 28 to visually display and record the pertinent information.

In addition to operating in the stand-alone mode as described above, the present invention can be utilized with a hammer blow rate processor means 30 and its associated elements as described in United States patent application Ser. No. 164,636, now U.S. Pat. No. 4,365,306, entitled *Method and Apparatus for Remotely Monitoring and Evaluating Pile Driving Hammers*, Peterson et al. When the present invention is utilized with the Peterson et al. device, a more complete analysis of a pile driving operation can be made.

From the foregoing, it will be understood that a preferred embodiment of the method of the present invention includes the steps of marking the object, such as the pile 2, with a first reflective material responsive to the ultraviolet energy; marking the object, in predetermined spaced relation with the first reflective material, with a second reflective material responsive to the ultraviolet energy; detecting when the first reflective material initially responds to the ultraviolet energy; detecting when the second reflective material initially responds to the ultraviolet energy; preventing the redetection of a response to the ultaviolet energy by the first reflective material after the initial response thereby to the ultraviolet energy until after the step of detecting when the second reflective material initially responds to the ultraviolet energy; and calculating, in response to the steps of detecting when the first reflective material initially responds and the step of detecting when the second reflective material initially responds to the ultraviolet energy, the distance the object has moved. The preferred method further comprises the step of emitting ultraviolet energy toward the first and second reflective materials. An alternative preferred method can utilize energy emissive, rather than energy reflective, material (i.e., material which emits energy in response to energy impinging thereon).

The present invention determines the time it takes to drive a pile to a known depth in order to determine the pile driving efficiency. The present invention provides a relatively simple, quick, reliable, real time, automatic, remote method and apparatus for obtaining information on the total distance a pile is driven and on the time it takes to drive the pile a specified distance. The present invention is useful for controlling the quality of pile-driving operations which is particularly desirable during the installation of piles for offshore petroleum production structures.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art which changes are encompassed within the spirit of this invention as defined by the appended claims.

What is claimed is:

1. An apparatus for monitoring the displacement of an object, comprising:
    multi-frequency energy source means for providing an output having frequencies within a predetermined spectrum of at least two frequencies;
    detector means for detecting when the output at a first one of said two frequencies has reached the object at a predetermined location thereon and for detecting when the output at a second one of said two frequencies has reached the object at a second predetermined location thereon and at a time later than that time at which the output at said first frequency reached the object; and
    means, responsive to said detector means, for monitoring the alternate detection of the outputs at said first and second frequencies reaching the object and for deriving the displacement of the object therefrom.

2. An apparatus for monitoring the displacement of an object as defined in claim 1, wherein said multi-frequency energy source means includes means for emitting ultraviolet energy.

3. An apparatus for monitoring the displacement of an object, as defined in claim 2, further comprising:
    first frequency responsive means having first reflector means, associated with the object, for reflecting a first portion of said ultraviolet energy; and
    second frequency responsive means having second reflector means, associated with the object and spaced from said first reflector means, for reflecting a second portion of said ultraviolet energy.

4. An apparatus for monitoring the displacement of an object as defined in claim 3, wherein said means for monitoring the alternate detection of the outputs at said first and second frequencies and for driving the displacement therefrom includes:
    signal processor means for determining when said detector means detects the output at said first frequency that has reached the object and for then determining when said detector means detects the output at said second frequency that has reached the object before again determining when said detector means detects the output at said first frequency that has again reached the object; and
    signal conditioner means for electrically interfacing said signal processor means with said detector means.

5. An apparatus for monitoring the displacement of an object, comprising:
    a first plurality of reflectors, disposed in spaced relation on the object, each of said first plurality of reflectors having means for reflecting a first predetermined spectrum of energy;
    a second plurality of reflectors, each being disposed on the object between respective consecutive ones of said first plurality of reflectors whereby an alternating arrangement of said first and second pluralities of reflectors is formed, and each of said second plurality of reflectors having means for reflecting a second predetermined spectrum of energy;
    first detector means for converting said reflected first predetermined spectrum of energy into a corresponding first electrical signal;
    second detector means for converting said reflected second predetermined spectrum of energy into a corresponding second electrical signal; and
    means, responsive to the consecutive detection of said first electrical signal and said second electrical signal, for deriving the distance the object has moved.

6. An apparatus for monitoring the displacement of an object as defined in claim 5, further comprising means for emitting ultraviolet energy toward said first and second pluralities of reflectors.

7. An apparatus for monitoring the displacement of an object as defined in claim 6, wherein said means for deriving the distance the object has moved includes:
    signal processor means for determining when said first detector means provides said first electrical signal and for then determining when said second detector means provides said second electrical signal before again determining when said first detector means provides said first electrical signal; and
    signal conditioner means for electrically converting said first electrical signal and said second electrical signal into respective corresponding signals having respective formats detectable by said signal processor means.

8. An apparatus for monitoring the displacement of an object, comprising:
    multi-frequency energy source means for providing energy having frequencies within a predetermined spectrum of at least two frequencies;
    first frequency responsive means, responsive to energy at a frequency within a first portion of said spectrum, for providing a first frequency output;
    second frequency responsive means, responsive to energy at a frequency within a second portion of said spectrum, for providing a second frequency output;
    first detector means for detecting said first frequency output and for providing a first electrical signal corresponding thereto;
    second detector means for detecting said second frequency output and for providing a second electrical signal corresponding thereto; and
    means, responsive to said first detector means and said second detector means, for monitoring the alternate detection of said first frequency output and said second frequency output by said first detector means and said second detector means, respectively, and for deriving the displacement of the object therefrom.

9. An apparatus for monitoring the displacement of an object as defined in claim 8, wherein said multi-frequency energy source means includes means for emitting ultraviolet energy.

10. An apparatus for monitoring the displacement of an object as defined in claim 9, wherein:
    said first frequency responsive means includes first reflector means, associated with the object, for reflecting a first portion of said ultraviolet energy thereby providing said first frequency output; and
    said second frequency responsive means includes second reflector means, associated with the object and spaced from said first reflector means, for reflecting a second portion of said ultraviolet energy thereby providing said second frequency output.

11. An apparatus for monitoring the displacement of an object as defined in claim 10, wherein said means for monitoring the alternate detection of said first frequency output and said second frequency output and for deriving the displacement therefrom includes:
signal processor means for determining when said first detector means detects said first frequency output and for then determining when said second detector means detects said second frequency output before again determining when said first detector means detects said first frequency output; and
signal conditioner means for electrically converting said first electrical signal and said second electrical signal into respective corresponding signals having respective formats detectable by said signal processor means.

12. An apparatus for monitoring the displacement of an object as defined in claim 8, wherein said means for monitoring the alternate detection of said first frequency output and said second frequency output and for deriving the displacement therefrom includes:
signal processor means for determining when said first detector means detects said first frequency output and for then determining when said second detector means detects said second frequency output before again determining when said first detector means detects said first frequency output; and
signal conditioner means for electrically converting said first electrical signal and said second electrical signal into respective corresponding signals having respective formats detectable by said signal processor means.

13. An apparatus for monitoring the displacement of an object, comprising:
source means for emitting ultraviolet energy;
first reflector means, disposed on the object, for reflecting a first predetermined spectrum of energy in response to said ultaviolet energy impinging upon said first reflector means;
second reflector means, disposed on the object in spaced relation with said first reflector means, for reflecting a second predetermined spectrum of energy in response to said ultraviolet energy impinging upon said second reflector means;
first detector means for converting said reflected first predetermined spectrum of energy into a corresponding first electrical signal;
second detector means for converting said reflected second predetermined spectrum of energy into a corresponding second electrical signal; and
means, responsive to the consecutive detection of said first electrical signal and said second electrical signal, for deriving the distance the object has moved.

14. An apparatus as defined in claim 13, wherein said means for deriving the distance the object has moved includes:
first utilizing means for utilizing said first electrical signal to derive a first position of the object;
first disabling means for disabling said first utilizing means to prevent the utilization of said first electrical signal after said first position is derived;
second utilizing means for utilizing said second electrical signal to derive a second position of the object and for enabling said first utilizing means; and
second disabling means for disabling said second utilizing means to prevent the utilization of said second electrical signal until after said first position is derived.

15. A method of monitoring the displacement of an object, comprising:
marking the object with a first reflective material responsive to ultraviolet energy;
marking the object, in predetermined spaced relation with the first reflective material, with a second reflective material responsive to ultraviolet energy;
detecting when the first reflective material initially responds to ultraviolet energy;
detecting when the second reflective material initially responds to ultraviolet energy;
preventing the redetection of a response to the ultraviolet energy by the first reflective material after the initial response thereby to ultraviolet energy until after the step of detecting when the second reflective material initially responds to ultraviolet energy; and
calculating, in response to said steps of detecting when the first reflective material initially responds and of detecting when the second reflective material initially responds, the distance the object has moved.

16. A method of monitoring the displacement of an object as defined in claim 15, further comprising the step of emitting ultraviolet energy toward said first and second reflective materials.

* * * * *